United States Patent [19]

Hahn

[11] 4,064,286

[45] Dec. 20, 1977

[54] RADIATION CURABLE COMPOSITIONS CONTAINING ORGANOSILICON COMPOUNDS

[75] Inventor: Ernest A. Hahn, Pittsburgh, Pa.

[73] Assignee: PPG Industries, Inc., Pittsburgh, Pa.

[21] Appl. No.: 683,433

[22] Filed: May 5, 1976

Related U.S. Application Data

[63] Continuation-in-part of Ser. No. 526,439, Nov. 22, 1974, abandoned.

[51] Int. Cl.² ................................................ B05D 3/06
[52] U.S. Cl. .................................. 427/44; 204/159.13; 260/827; 427/53; 427/54
[58] Field of Search ............................. 427/44, 53, 54; 204/159.13; 260/824 R, 827

[56] References Cited

U.S. PATENT DOCUMENTS

| | | | |
|---|---|---|---|
| 2,860,074 | 11/1958 | Hedlund | 250/824 R |
| 3,075,941 | 1/1963 | Wynstra et al. | 260/824 R |
| 3,645,984 | 2/1972 | Dowbenko et al. | 204/159.22 |
| 3,709,956 | 1/1973 | Nordstrom | 204/159.13 |
| 3,714,288 | 1/1973 | Nordstrom | 204/159.13 |
| 3,719,723 | 3/1973 | Nordstrom | 204/159.13 |
| 3,850,772 | 11/1974 | Sekmakas | 204/181 |
| 3,959,203 | 5/1976 | Keil | 260/827 |
| 3,992,276 | 11/1976 | Powanda et al. | 204/159.13 |

*Primary Examiner*—John H. Newsome
*Attorney, Agent, or Firm*—Carl T. Severini

[57] ABSTRACT

This invention relates to radiation curable compositions having improved resistance to color bleaching, resistance to chalking and/or improved gloss retention. The compositions comprise ethylenically unsaturated diacrylate or an unsaturated polyester in admixture with a polymerized aminoalkyl alkoxysilane.

10 Claims, No Drawings

RADIATION CURABLE COMPOSITIONS CONTAINING ORGANOSILICON COMPOUNDS

CROSS-REFERENCE TO RELATED APPLICATION

This application is a continuation-in-part of application Ser. No. 526,439, filed Nov. 22, 1974 now abandoned.

BACKGROUND OF THE INVENTION

A number of radiation curable unsaturated materials are known in the art which form highly useful coating compositions; however certain of these compositions have less than excellent exterior durability. Examples of such radiation curable compositions are disclosed in U.S. Pat. Nos. 3,759,808; 3,645,984 and 3,647,737.

DESCRIPTION OF THE INVENTION

It has been found that the addition of an organosilicon compound selected from the group consisting of an organosilicon compound having a terminal acrylic group, or a polymerized aminoalkyl alkoxysilane to certain radiation curable compositions markedly enhances the exterior durability of the radiation curable compositions.

The radiation curable compositions useful in the compositions of this invention include generally essentially any radiation curable organic polyacrylate and, preferably the ethylenically unsaturated diacrylates generally having the formula:

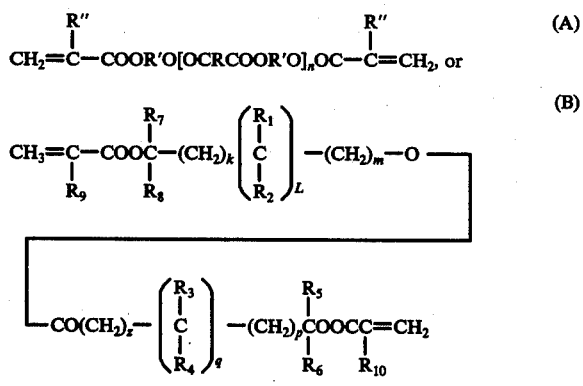

wherein R″ is either H or $CH_3$, R′ is a divalent saturated or unsaturated aliphatic hydrocarbon radical having from about 2 to 10 carbon atoms such as ethylene, trimethylene, tetramethylene, butylene, ethylbutylene, hexamethylene, octamethylene, cyclohexylene, propylene, trimethylene, decamethylene, dimethylpropylene and the like. R represents a connecting linkage between the two adjacent carboxylic radicals selected from the class consisting of a single valence bond and a divalent saturated or unsaturated hydrocarbon radical having up to about 10 carbon atoms. Examples of these linkages are aromatic radicals such as ortho, meta or paraphenylene, tetrachlorophenylene and the like and nonaromatic radicals such as ethylene, tetramethylene, octamethylene, cyclohexylene, tetraethylene octamethylene and the like and where $n$ is about 1 to about 10 and preferably predominantly 1 to 4.

$R_1$, $R_2$, $R_3$ and $R_4$ are selected from the group consisting essentially of H, alkyl, aryl, and cycloakyl, substituted alkyl, substituted aryl and substituted cycloalkyl groups. The alkyl groups may be of any length but the preferred alkyl radicals contain from 1 to 8 carbon atoms such as methyl, ethyl, isopropyl, hexyl, octyl, and the like. The preferred cycloalkyl groups contain from 5 to 8 carbon atoms such as cyclopentyl, cyclohexyl, cycloheptyl and cyclooctyl. The preferred aryl groups contain up to 8 carbon atoms such as phenyl, benzyl, and the like. The alkyl, cycloalkyl and aryl radicals may also be substituted with halogens, hydroxyl, etc. Examples of these radicals are chloropropyl, bromobenzyl, chlorocyclopentyl, hydroxyethyl, chlorooctyl, chlorophenyl, bromophenyl, hydroxyphenyl, and the like.

The radicals $R_5$, $R_6$, $R_7$ and $R_8$ are selected from the group consisting of H, alkyl, aryl, and cycloalkyl. Examples of the alkyl, cycloaklyl, and aryl radicals which may apply are given above under the discussion of $R_1$, $R_2$, $R_3$ and $R_4$.

The radicals $R_9$ and $R_{10}$ are selected from the group consisting of H, alkyl groups containing from 1 to 2 carbon atoms, halo-substituted alkyl groups containing from 1 to 2 carbon atoms, and halogen. Examples are methyl, ethyl, bromoethyl, and chlorine.

Although $R_1$, $R_2$, $R_3$, $R_4$, $R_5$, $R_6$, $R_7$, $R_8$, $R_9$, and $R_{10}$ may be the same radicals, each one of them may be different from the other as long as they fall under the general definition for each. That is to say, that while $R_1$ and $R_2$ may be H, $R_3$ may be ethyl, $R_4$ may be pentyl, $R_5$ and $R_6$ may be cyclohexyl, etc.

Subscripts $k$, $L$, $m$, $z$, $q$ and $p$ are whole numbers having values from 0 to 5, and n is a number from 0 to 10.

The most preferred of the diacrylates having the Formula A are neopentylglycol diacrylate and materials having the formula:

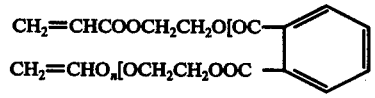

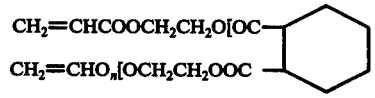

where $n$ is as defined above.

The preferred compounds having the Formula B are those that contain the neopentyl type structures, for example, those wherein $R_1$, $R_2$, $R_3$, and $R_4$ are lower alkyl groups, such as methyl, ethyl and propyl, and $R_5$, $R_6$, $R_7$ and $R_8$ are H, and $p$ and $k$ are 0, L and $q$ are 1, and $m$ and $z$ have values of 1 or 2. It has been found that these compounds exhibit the most durable and weather-resistant properties.

The most preferable compound having this structure is acryloxypivalyl acryloxypivalate, in which $R_1$, $R_2$, $R_3$, $R_4$ are $CH_3$ radicals and $R_5$, $R_6$, $R_7$, $R_8$, $R_9$, and $R_{10}$ are H and $m$, L and $q$ are 1 and $k$, $z$ and $p$ are 0.

Examples of other compounds having the above structures are methacryloxypivalyl methacryloxypivalate where $R_1$, $R_2$, $R_3$, $R_4$, $R_9$ and $R_{10}$ are $CH_3$ radicals and $R_5$, $R_6$, $R_7$, and $R_8$ are H and L, $m$ and $q$ are 1 and $k$, $z$ and $p$ are 0, 4-acryloxybutyl 4-acryloxybutyrate where $R_1$ to $R_{10}$ are H and L and $q$ are 1, $k$ and $p$ are 2 and $m$ and $z$ are 0, acryloxypivalyl 4-acryloxybutyrate where $R_5$ to $R_{10}$ are H, $R_1$ and $R_2$ are $CH_3$. $k$ and $q$ are 0, 1, $m$ and $p$ are 1 and $z$ is 2, 2-acryloxyethyl acryloxypivalate where $R_5$ to $R_{10}$ are H and $R_3$ and $R_4$ are $CH_3$. $k$ and $q$ are 1 and L, $m$, $z$, and $p$ are 0.

It is noted that mixtures of any two or more of the above compounds are also intended to be included by the above formula. These radiations curable compositions are disclosed in U.S. Pat. Nos. 3,759,808; 3,645,984 and 3,647,737, the disclosures of which are hereby incorporated by reference.

Another class of resins which can be utilized in the compositions of the invention are unsaturated polyesters, solubilized in vinyl monomers. The unsaturated polyesters are ordinarily prepared from mixtures of alpha-beta ethylenically unsaturated polycarboxylic acids and polyhydric alcohols.

The ethylenically unsaturated polycarboxylic acids include such acids as:

| | |
|---|---|
| maleic acid | mesaconic acid |
| fumaric acid | citraconic acid |
| aconitic acid | itaconic acid | and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in am amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:

| | |
|---|---|
| ethylene glycol | polypropylene glycol |
| diethylene glycol | glycerol |
| triethylene glycol | neopentyl glycol |
| polyethylene glycol | pentaerythritol |
| propylene glycol | trimethylol propane |
| dipropylene glycol | trimethylol ethane | and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional cross-linking sites, which is a desired feature in some polyesters. Examples of useful dicarboxylic acids which are either saturated or only aromatically unsaturated include:

| | |
|---|---|
| succinic acid | sebacic acid |
| adipic acid | isophthalic acid |
| suberic acid | terephthalic acid |
| azelaic acid | tetrachlorophthalic acid | and the like. As in the case of the ethylenically unsaturated acids, the anhydrides of these acids, where the anhydrides exist, are, of course, embraced in the term "acid", since the polyesters obtained therefrom are the same. Furthermore, for purposes of the present invention, the aromatic nuclei of such acids as phthalic acid are generally regarded as saturated since the double bonds do not react by addition, as do ethylenic groups.

Therefore, wherever the term "saturated dicarboxylic acid" is utilized, it is to be understood that such term includes the aromatically unsaturated dicarboxylic acids. Such "saturated carboxylic acids" may also be referred to as "nonolefinically unsaturated" polycarboxylic acids.

Vinyl monomers which crosslink with unsaturated polyesters to form the thermosetting materials may be interpolymerized with the acrylic compounds and polyesters, if desired. Such vinyl monomers may include:

| | |
|---|---|
| styrene | hexyl acrylate |
| alpha-methylstyrene | octyl acrylate |
| divinylbenzene | octyl methacrylate |
| diallyl phthalate | diallyl itaconate |
| methyl acrylate | diallyl maleate |
| methyl methacrylate | | and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and phthalic or isophthalic acid as the carboxylic acids with styrene of diallyl phthalate or vinyl toluene as the solubilizing monomer.

One group of organosilicon compounds used in the compositions utilized in this invention are reaction products of acrylic acid with an organopolysiloxanes corresponding to the general unit formula

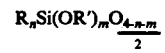

where R is a monovalent organic radical bonded to silicon by a carbon-to-silicone bond and R' is hydrogen, an alkyl radical, an aryl radical, or an acyl radical. The value of n is the above formula is between about 0.5 to 1.9 and the value of m between 0.01 and 2.5; the value of m plus n must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl, cyclobuty, cyclopentyl; aryl radicals including alkaryl and aralkyl, for example, phenyl, methylphenyl, benzyl, phenylethyl and the like; alkenyl, for instance, vinyl, allyl, 3-butenyl, oleyl and linoleyl; cycloalkenyl radicals, such as cyclopentadienyl and 2-cyclobutenyl; as well as alkenylaryl groups such as the vinylphenyl radical. R may also be a substituted hydrocarbon radical, for example, a halo-substituted radical such as pentachlorophenyl, 1-bromo-3-trichloropropyl and perfluoroalkyl radicals, e.g., gamma-trifluoropropyl, delta-trifluoro-gamma-difluorobutyl, or it may be an amino-substituted hydrocarbon group such as aminomethyl, 3-aminopropyl, 4-aminobutyl, and the like. Other substituted hydrocarbon radicals which may be included within the scope of the R substituent are cyanosubstituted hydrocarbon radicals such as 3-cyanopropyl, carboxyl-substituted radicals such as 3-carboxylpropyl, and sulfur-substituted radicals, including 3-mercapto propyl, ethyl thioethyl, ethyl dithiopropyl, ethyl sulfinylpropyl, ethyl sulfonylpropyl, as well as hydroxy-substituted radicals, such as hydroxypropyl or hydroxybutyl.

The groups represented by R' include hydrogen, in which case the OR' group is a hydroxyl radical, and alkyl groups of 1 to 20 carbon atoms, such as methyl, ethyl, propyl, butyl, amyl, hexyl, heptyl and octyl. R' may also be an aryl radical such as pheny, tolyl or halogen or other substituted phenyl, or an acyl radical such as acetyl, propionyl, butyryl or other similar acyl radicals, generally having between 1 and 8 carbon atoms.

The organosiloxanes for use in this invention are produced by conventional methods; often or organoalkoxysiloxane is partially hydrolyzed, thus replacing some of the alkoxy substituents with hydroxy groups, and the hydrolyzate is condensed to produce the desired siloxane resin. There may remain residual OH groups if the hydrolyzate is not completely condensed. The oganosiloxane may also be produced using an organosilicon halide as the intermediate. Such methods are well known and the usefulness of organosiloxanes of the above formula in the coating compositions of this invention does not depend upon the method by which they are produced.

Examples of organosiloxanes and methods of producing them can be found in various publications as well as in patents such as U.S. Pat. Nos. 2,258,218, 2,258,219, 2,258,222, 2,371,050, 2,389,477, 2,584,341, 2,663,694, 2,746,942, 2,768,149, and 3,015,637.

The preferred organosiloxanes are those now commercially available which usually contain phenyl and/or methyl substitution, such as, for example, those represented by the empirical formulas:

and

where R is defined as above.

Acrylic acid is condensed with the above organopolysiloxane, utilizing at least about one mole of acrylic acid per mole of organopolysiloxane.

The conditions at which the condensation reaction is carried out are ordinarily not critical and are chosen with reference to the particular reactants, reaction medium and desired extent of reaction. The mixture of acrylic acid and organopolysiloxane and preferably a suitable solvent such as xylene, toluene or other similarly inert solvent, can be heated over a wide temperature range, depending primarily upon the boiling point of the solvent, for a time sufficient to provide the desired reaction. Generally, the temperature is between about 50° C. and about 200° C. The presently preferred oraganosiloxane reactant is Sylkyl 50, i.e.

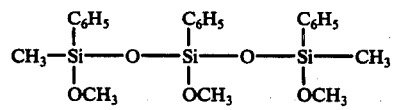

The resultant organosilicon compound corresponds to the general formula:

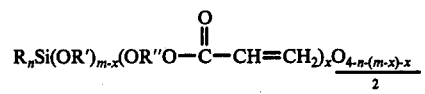

R and R' are as described immediately above. The value of n in the above formula is between about 0.5 to 1.9 and the value of $(m-x) + x$ between 0.01 and about 2.5; with the proviso that there is at least about one $(OR''OOCCH=CH_2)_x$ per mole of the organosilicon compound; the value of $n + (m-x) + x$ must be between 0.51 and 3.

The presently preferred organosiloxane of this group corresponds to the formula:

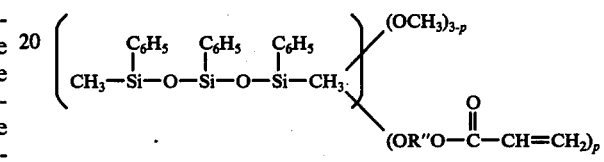

and preferably

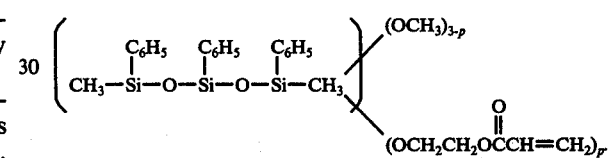

where R" is a lower alkylene radical and p is at least one and preferably at least 2. These compounds are termed herein acryloxysilanes.

Another group of organosilicon materials useful in the compositions utilized in this invention are condensation polymers of aminoalkylsilane of the formula

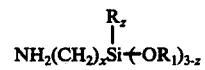

where R and $R_1$ are lower alkyl, x is an integer from 2 to 4 and z is an integer from 0 to 1. The presently preferred polymer of this class is a polymer of 2-aminopropyltriethoxysilane, for example, solutions of the polymer known as Union Carbide's Y-5042, and Y-1573.

The organosilicon material is employed in the coating composition of the invention in an exterior durability enhancing amount. The optimum amount varies to some extent based on the particular organosilicon, the particular base resin and the nature of the total composition. Generally, however, amounts of the acryloxysilane range from about 0.5 to about 3.5% by weight, based on the total resin are effective. It has been found that with the polymerized aminoalkylsilanes the significantly smaller amount generally in the range of about 0.2 to about 1.5% by weight based on the total resin are effective.

It is noted that the curable materials and mixtures described above may be mixed with other monomers and polymers. Examples of polymers which may be utilized along with the novel mixtures of this invention are acrylic polymers and vinyl polymers. Examples of other monomers which may be used along with the mixtures are acrylic monomers such as alkyl acrylates and methacrylates such as ethyl acrylate, butyl acrylate, 2-ethylhexylacrylate and methacrylate, lauryl acrylate and methacrylate and hydroxy alkyl acrylates and methacrylates such as hydroxyethyl acrylates and hydroxy methylmethacrylate and the like. Other materials may also be used to enhance the physical properties of the coating composition such as conventional pigments, plasticizers, etc.

The compositions of the invention may be cured by the use of actinic light or ionizing irradiation.

The term "irradiation", as used herein, means high energy radiation and/or the secondary energies resulting from the conversion of electrons or other particle energy to X-rays or gamma radiation. While various types of irradiation are suitable for this purpose, such as X-rays and gamma rays, the radiation produced by the accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 50,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation", which has been defined as radiation possessing an energy at least sufficient to produce ions or to break chemical bonds and thus includes also radiations such as "ionizing particle radiation" as well as radiations of the type termed "ionizing electromagnetic radiation".

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers. Van der Graaff generators, beta-trons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy conferred to the electrons by potential accelerators of over 0.1 million electron volts (mev.). In addition to irradiation of this type, commonly called X-rays, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The compositions described herein will polymerize acceptably using a total dosage between about 0.2 megarad and about 20 megarads. The necessary or optimum amount varies with the nature of the total composition, but can be readily determined. A "rad" is defined as that amount of radiation required to supply 100 ergs per gram of material being treated, and a "megarad" is $10^6$ rads. The total dosage is the total amount of irradiation received by the monomer. It has been found that the compositions of this invention will polymerize to hard, mar-resistant and stainresistant films at a total dosage of less than 4 megarads. The preferable total dosage used is from about 0.5 megarad to about 10 megarads.

The compositions of this invention may also be cured by adding free-radical catalysts to the compositions and heating the resulting mixtures to cure. Any conventional free-radical catalyst may be used such as organic peroxides, organic hydroperoxides, or esters thereof. Examples are benzoyl peroxide, tertiary-butyl perbenzoate, tertiarybutyl hydroperoxide, cumene hydroperoxide, azobis(isobutyronitrile) and the like. The catalysts are generally used in amounts of about 0.1 percent to about 5 percent by weight of the monomer or mixtures of monomers.

The catalyzed compositions may be heated to cure. Although curing temperatures will vary from monomer to monomer, generally temperatures from about 75° F. to about 300° F. are used to bring about the free-radical cure of the compositions.

In many instances, it may be desirable to polymerize without the addition of external heat in which cases it is customary to add an accelerator to the system. Suitable accelerators include cobalt salts, such as cobalt octoate or cobalt naphthenate and amine accelerators such as N,N-dimethylaniline, N-ethyl-N-hydroxyethyl-m-ethylaniline and N-propyl-N-hydroxyethyl-m-methylaniline.

The compositions have great utility as coatings for all types of substrates. They may be used as protective coatings for wood to form panels for walls, as coatings on plastics—to form floor tiles, as coatings on metals such as aluminum and steel panels and as coatings for other substrates, scratch-resistance, mar-resistance, water-resistance and chemical-resistance (to acids and bases), and the cured coatings have a high degree of crosslinking.

The coatings may be formed by applying the compositions onto a substrate by any conventional coating means, such as roller coating, curtain coating, brushing, spraying, etc. The coated article may then be cured either by adding peroxide to the coating or by subjecting the coating to actinic light or to ionizing irradiation. It is noted that many of the monomers have extremely low viscosity, thus insuring easy application if the product is to be used as a coating.

The use of ionizing irradiation to polymerize the monomers is preferred as this method makes it possible to polymerize the coatings at extremely high speeds and thus eliminate the time consuming baking steps, and as the use of ionizing irradiation requires no heating, the danger of high temperatures damaging a heat-sensitive substrate is eliminated.

It is also noted that the use of ionizing irradiation requires no solvents, thus reducing the danger of poisonous and explosive vapors and that the coatings formed by the use of ionizing irradiationconventionally cured coatings.

The following examples set forth specific embodiments of the instant invention, however the invention is not to be construed as being limited to these embodiments for there are, of course, numerous possible variations and modifications. All parts and percentages in the examples, as well as throughout the specification, are by weight unless otherwise indicated.

EXAMPLE 1

A polyester resin was prepared in a conventional manner by reacting 232 parts ethylene glycol and 262 parts hexahydrophthalic anhydride in the presence of 0.494 part butyl stannoic acid. The Gardner-Holdt viscosity was Y-and the acid number of the polyester was about 0.79.

A polyester diacrylate was prepared by reacting 412 parts of the above polyester resin and 267 parts acrylic acid in the presence of 5 parts hydroquinone and 16 parts sulfuric acid. The resulting polyester diacrylate composition had a solids contents of about 98.1 percent, a Gardner-Holdt viscosity of about T and an acid number of about 0.44.

EXAMPLE 2

An acrylic monomer was prepared as follows:

A reactor was charged with 7140 grams of hydroxypivalyl hydroxypivalate having the formula

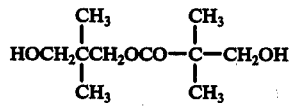

1190 grams of cyclohexane, 1324 grams of acrylic acid, 62.2 grams of sulfuric acid, and 124.4 grams of hydroquinone. The reactants were heated to reflux at 200° F. and 3972 grams of acrylic acid were added dropwise over a period of 30 minutes at 208° F. The reaction was run for an additional 4 hours during which time 2730 grams of cyclohexane were added and 1235 grams of water were distilled off. The final product, acryloxypivalyl acryloxypivalate, was obtained in 90 percent yields after purification by washing.

EXAMPLE 3

A curable composition was prepared having the formula where $n$ is primarily 1–4 with some $n$'s as large as 9–10. The composition was prepared by the reaction of adipic acid, neopentyl glycol and acrylic acid.

EXAMPLE 4

A polyester resin was prepared in the conventional manner by reacting 272.8 parts ethylene glycol and 296 parts phthalic anhydride in the presence of 0.57 part butyl stannoic acid. The Gardner-Holdt viscosity was Z-2+ and the acid number of the polyester was about 0.84.

A polyester diacrylate was prepared by reacting 777 parts of the above polyester resin and 475 parts acrylic acid in the presence of 2290 parts toluene, 9.6 parts hydroquinone and 28.7 parts sulfuric acid. The resultant polyester was washed with aqueous base and dried to yield a polyester diacrylate composition having a solids content of 99+ percent, a Gardner-Holdt viscosity of U-V and an acid number of about 2.

EXAMPLE 5

A polyester resin was prepared in a conventional manner by reacting 10.9 moles of neopentyl glycol, 5.0 moles of maleic anhydride and 5.0 moles of isophthalic acid. The polyester has a Gardner-Holdt viscosity of greater than Z-6 and an acid number of about 21.2. A curable composition was formulated from 75 parts of the polyester and 25 parts of styrene. The composition was stabilized with 0.17% trimethylbenzylammonium chloride and 0.01% methylhydroquinone.

EXAMPLE 6

An acrylic terminated organosilicon compound was prepared by charging into a reactor 1 mole of an organosilicon compound corresponding to the formula

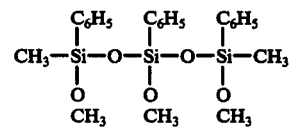

(Sylkyd 50) and 3 moles of hydroxyethyl acrylate together with 1 gram of tetrabutyl titanate, heating the mixture to about 60° C. and with the aid of an air sparge, distilling off methanol. The product contained 2.2 moles of bound hydroxyethyl acrylate and contained 11.2% Si.

EXAMPLE 7

The compositions of Examples 1 thru 5 were formulated into a high gloss pastel blue coating composition wherein the pigment composition was 99% TiO$_2$ and 1% Phthalic blue. The pigment to binder ratio was .55. Various amounts of organosilicon resins were added for comparison with the silicon-free coating. The pigmented compositions were applied to a vinyl primed aluminum substrate to yield a dry film thickness of one

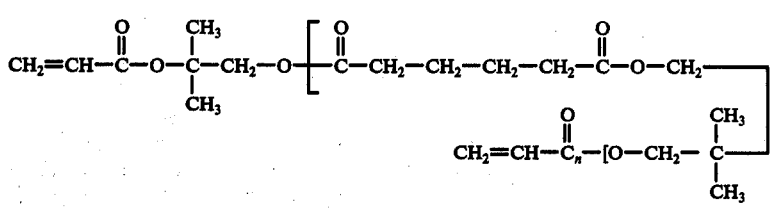

mil. The films were cured utilizing a high power electron linear accelerator. The coatings were then exposed and gloss retention and color retention noted, as summarized in the following table:

TABLE

| Coating Resin Example No. | Organo-Silicon | Cure Dose M.R. | 24 Months Horizontal Florida Exposure | | |
|---|---|---|---|---|---|
| | | | % Si on Total Resin | Hinter Color Difference | Percent 60° Gloss Retention |
| 1 | None | 5 | 0 | 24.6 | 32 |
| 1 | Ex. 6 | 5 | 3.0 | 6.4 | 56 |
| 1 | Y-5042 | 5 | .45 | 12.8 | 75 |
| 2 | None | 1 | 0 | 23.5 | 22 |
| 2 | Ex. 6 | 1 | 3.0 | 2.1 | 82 |
| 2 | Y-5042 | 1 | .45 | 3.7 | 87 |
| 3 | None | 5 | 0 | 15.0 | 4 |
| 3 | Ex. 6 | 5 | 3.0 | 4.5 | 58 |
| 4 | None | 5 | 0 | 9.7 | 39 |
| 4 | Ex. 6 | 5 | 3.0 | 5.7 | 34 |
| 4 | Y-5042 | 5 | .45 | 6.3 | 75 |
| 5 | None | 9-12 | 0 | 9.1 | 28 |
| 5 | Ex. 6 | 9-12 | 3.0 | 3.3 | 77 |

Y-5042 is a solution of polymerized gamma-aminopropyltriethyoxysilane prepared by adding three moles of water to one mole of the silane to form a polymer having the repeating formula $H_2NC_3H_6SiO_{3/2}$. Y-5042 has the following composition: 5% polymer, 6% ethanol, and 89% of a mixture of 90 parts of toluene, 5 parts of butanol and 5 parts of butyl cellosolve.

While specific examples have been set forth above, other curable components and organosilicons within the teachings above may be substituted for the specifically exemplified materials to achieve results within the scope of the invention.

According to the provisions of the patent statutes, there is described above the invention and what are now considered to be its best embodiments. However, within the scope of the appended claims, it is to be understood that the invention can be practiced otherwise than is specifically described.

I claim:

1. A composition comprising
   A. a polymerizable unsaturated organic material selected from the group consisting of
      1. radiation curable organic polyacrylates and
      2. radiation curable unsaturated polyester resins admixed with at least one copolymerizable monomer, said polyester being a condensation product of an unsaturated polycarboxylic acid and a polyhydric alcohol and
   B. an exterior durability enhancing amount of a condensation polymer of a compound corresponding to the formula $$NH_2(CH_2)_xSi(OR_1)_{3-z} \overset{R_z}{|}$$

where R and $R_1$ are lower alkyl, $x$ is an integer from 2 to 4 and $z$ is an integer from 0 to 1.

2. A composition comprising
   A. a polymerizable unsaturated material selected from the group consisting
      1. ethylenically unsaturated diacrylates having the formulas:

(a) $CH_2=\overset{R''}{\underset{|}{C}}-COOR'O[OCRCOOR'O]_nOC-\overset{R''}{\underset{|}{C}}=CH_2$, or (b) $[CH_3]CH_2=\overset{R_7}{\underset{R_9}{C}}-COO\overset{R_1}{\underset{R_8}{C}}-(CH_2)_k\left(\overset{R_1}{\underset{R_2}{C}}\right)_L-(CH_2)_m-O-$
$-CO(CH_2)_z-\left(\overset{R_3}{\underset{R_4}{C}}\right)_q-(CH_2)_p\overset{R_5}{\underset{R_6}{COOC}}\overset{}{\underset{R_{10}}{C}}=CH_2$ wherein R" is H or $CH_3$, R' is a divalent saturated or unsaturated aliphatic hydrocarbon radical having from about 2 to 10 carbon atoms, R represents a connecting linkage between the two adjacent carboxylic radical selected from the class consisting of a single valence bond, and a divalent saturated or unsaturated hydrocarbon radical having up to about 10 carbon atoms, n is between about 1 and about 10;

$R_1$, $R_2$, $R_3$ and $R_4$ are selected from the group consisting of H, alkyl, aryl, and cycloalkyl, substituted alkyl, substituted aryl and substituted cycloalkyl groups;

$R_5$, $R_6$, $R_7$ and $R_8$ are selected from the group consisting of H, alkyl, aryl, and cycloalkyl;

$R_9$ and $R_{10}$ are selected from the group consisting of H, alkyl groups containing from 1 to 2 carbon atoms, and halo-substituted alkyl groups containing from 1 to 2 carbon atoms, and halogen;

subscripts $k$, $L$, $m$, $z$, $q$ and $p$ are whole numbers having values from 0 to 5; and 2. an unsaturated polyester resin admixed with at least one copolymerizable monomer, and B. an exterior durability enhancing amount of a condensation polymer of a compound corresponding to the formula $$NH_2(CH_2)_xSi(OR_1)_{3-z} \overset{R_z}{|}$$

where R and $R_1$ are lower alkyl, $x$ is an integer from 2 to 4 and $z$ is an integer from 0 to 1.

3. A composition, as in claim 2, wherein the organosilicon material is a condensation polymer of aminopropyltriethoxysilane.

4. A composition, as in claim 3, wherein (a) comprises either $CH_2=CHCOOCH_2CH_2O[OC-\phenyl$
$CH_2=CHO_n[OCH_2CH_2OOC-\phenyl$ or $CH_2=CHCOOCH_2CH_2O[OC-\cyclohexyl$
$CH_2=CHO_n[OCH_2CH_2OOC-\cyclohexyl$ or mixtures thereof, where $n$ is between about 1 and about 10.

5. A composition, as in claim 4, wherein $n$ is predominantly 1 to 4.

6. In a method of coating which comprises applying a curable coating composition to a substrate and curing the coating employing actinic light or ionizing irradiation, the improvement which comprises employing as the curable coating composition a composition comprising A. a polymerizable unsaturated organic material selected from the group consisting of
1. radiation curable organic polyacrylates and radiation curable unsaturated polyester resins admixed with at least one copolymerizable monomer, said polyester being a condensation product of an unsaturated polycarboxylic acid and a polyhydric alcohol and B. an exterior durability enhancing amount of a condensation polymer of a compound corresponding to the formula

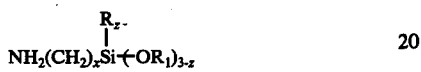

where R and $R_1$ are lower alkyl, $x$ is an integer from 2 to 4 and $z$ is an integer from 0 to 1.

7. In a method of coating which comprises applying a curable coating composition to a substrate and curing the coating employing ionizing irradiation, the improvement which comprises employing as the curable coating composition a composition of A. a polymerizable unsaturated material selected from the group consisting of
1. ethylenically unsaturated diacrylates having the formulas:

(a) 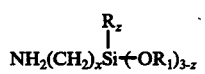

(b) 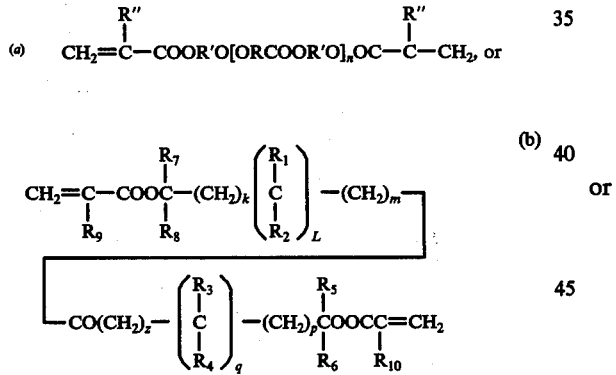

wherein R" is H or $CH_3$, R' is a divalent saturated or unsaturated aliphatic hydrocarbon radical having from about 2 to 10 carbon carbon atoms, R represents a connecting linkage between the two adjacent carboxylic radicals selected from the class consisting of a single valence bond, and a divalent saturated or unsaturated hydrocarbon radical having up to about 10 carbon atoms, $n$ is between about 1 and about 10;

$R_1$, $R_2$, $R_3$ and $R_4$ are selected from the group consisting of H, alkyl, aryl, and cycloalkyl, substituted aryl and substituted cycloalkyl groups;

$R_5$, $R_6$, $R_7$ and $R_8$ are selected from the group consisting of H, alkyl, aryl, and cycloalkyl;

$R_9$ and $R_{10}$ are selected from the group consisting of H, alkyl groups containing from 1 to 2 carbon atoms, halo-substituted alkyl groups containing from 1 to 2 carbon atoms, and halogen;

subscripts $k$, $L$, $m$, $z$, $q$ and $p$ are whole numbers having values from 0 to 5; and 2. unsaturated polyester resin admixed with at least one copolymerizable monomer and B. an exterior durability enhancing amount of a condensation polymer of a compound corresponding to the formula

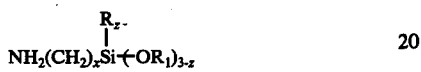

where R and $R_1$ are lower alkyl, $x$ is an integer from 2 to 4 and $z$ is an integer from 0 to 1.

8. A method, as in claim 7, wherein the organosilicon material is a condensation polymer of aminopropyltriethyoxysilane.

9. A method as in claim 8, wherein (A) comprises either

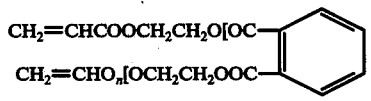

or

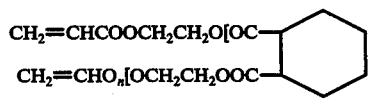

or mixtures thereof, wherein $n$ is between about 1 and about 10.

10. A method, as in claim 9, wherein $n$ is predominantly 1 to 4.

* * * * *